United States Patent
Hotier

(10) Patent No.: US 6,284,200 B1
(45) Date of Patent: *Sep. 4, 2001

(54) FLUSHING APPARATUS IN A SIMULATED MOBILE BED ADSORPTION UNIT COMPRISING TWO FLUID DISTRIBUTION LINES, AND THE USE THEREOF

(75) Inventor: Gerard Hotier, Rueil Malmaison (FR)

(73) Assignee: Institut Francais du Petrole (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/985,704

(22) Filed: Dec. 5, 1997

(30) Foreign Application Priority Data

Dec. 5, 1996 (FR) .................................................. 96 15071

(51) Int. Cl.[7] .............................. B01D 50/00; F01N 3/10; C10G 25/00
(52) U.S. Cl. ....................... 422/171; 422/169; 208/310 R
(58) Field of Search ...................................... 422/176–178, 422/182, 188, 211, 169, 171; 208/310 R, 310 Z; 585/734–751, 820–824; 423/210

(56) References Cited

U.S. PATENT DOCUMENTS

| 3,201,491 | 8/1965 | Stine et al. ............................. 210/676 |
| 3,268,605 | 8/1966 | Boyd, Jr. ................................ 585/821 |

FOREIGN PATENT DOCUMENTS

96/12542   5/1996   (WO) .

*Primary Examiner*—Marian C. Knode
*Assistant Examiner*—Alexa A. Doroshenk
(74) *Attorney, Agent, or Firm*—Millen, White, Zelano & Branigan, P.C.

(57) ABSTRACT

A simulated moving bed flushing apparatus and its use are described. The adsorber comprises a plurality of beds (10, 11) of adsorbent, each bed being connected to a distribution means (5) comprising two fluid distribution lines (2,1,) the first distribution line (2) of each distribution means being connected to at least one inlet (7) for feed and to at least one raffmate outlet (8), the other line 1 being connected to at least one solvent inlet (3) and to at least one extract outlet (4), each inlet and outlet comprising an on-off valve (7a, 8a, 3a, 4a), the first distribution line (2) comprising a flushing valve (9), and all of the flushing valves (9) relating to all of the distribution lines (2) are connected to means (100, 102) for circulating a fluid to be displaced.

FIG. 1 to be published.

14 Claims, 2 Drawing Sheets

FLUSHING APPARATUS IN A SIMULATED MOBILE BED ADSORPTION UNIT COMPRISING TWO FLUID DISTRIBUTION LINES, AND THE USE THEREOF

FIELD OF THE INVENTION

The invention concerns a flushing apparatus in a countercurrent or cocurrent simulated moving bed adsorption unit for a feed, and its use.

It is of particular application to separation of aromatic hydrocarbons containing 8 carbon atoms, in particular for the production of very high purity para-xylene.

BACKGROUND OF THE INVENTION

The prior art is illustrated by United States patents U.S. Pat. No. 3,201,491, International patent WO 96/12542, European patent EP-A-0 787 517 and U.S. Pat. No. 3,268,605.

A simulated counter-current or simulated moving bed adsorption separation process must include:

an assembly of beds of adsorbent (or fixed phase) disposed in a closed loop, the total number of beds generally being in the range three to twenty-four.

Means for connecting each of these beds with streams feeding the separation unit, such as solvent(s), feed(s) to be separated, or an internal reflux.

Means for connecting each of the beds with streams issuing from the separation unit, such as extract(s), raffinate(s).

Means for connecting each of the beds with the following bed (in the direction of fluid circulation).

Depending on the particular embodiment, either a fluid recirculation unit is placed between the last and first bed (pump or compressor), or an apparatus which can interrupt the stream is placed between two successive beds (on-off valve), or an apparatus which can regulate the flow rate and/or pressure is located at the inlet to each bed.

Two types of embodiments are available:

Each bed is contained in an independent receptacle and a line connects it to the following bed. In such a case, it is advantageous to connect an independent line per inlet and outlet stream to that line. The AROMAX process from TORAY Industries falls into this process category and constitutes a large scale embodiment. While the individual beds are disposed in a single column, they are separated by solid plates, and all of the fluid from each bed is collected by a line which leaves the column and then returns to feed the following bed. More generally for small units, it is convenient to isolate each bed in a particular receptacle and to connect it to the following bed by a line. In that type of embodiment, it is easier to use one line per inlet or outlet stream and per bed, thus avoiding any problems of contamination of one stream be another.

Several beds are contained in a single receptacle or column and each bed is separated from the following bed by a distributor plate which must carry out four functions:

collect the fluid which gathers at the end of the bed;

withdraw a portion of the fluid during certain phases of the cycle so that the composition of the withdrawn portion is identical to the composition of the fluid as a whole;

inject an external fluid into the internal fluid during certain phases of the cycle and form a mixture which is homogeneous in composition;

distribute the fluid to the inlet to the following bed.

The PAREX process described in U.S. Pat. No. 2,985,589 shows how it is possible to connect at least two inlet streams and two outlet streams sequentially, by means of a valve, to each of the beds containing adsorbent.

That patent clearly discloses each distributor connected via a single line to a valve which successively connects each distributor to the feed then to the extract, then to the solvent, then to the raffinate.

Such a procedure has the disadvantage of considerably reducing the performance of the process (purity and yield) since each stream is contaminated by the contents of the common line when a given stream is connected to a particular bed.

Purely by way of illustration, let us consider a column sub-divided into twelve beds and operating as follows:

In period n°1 of the cycle (which comprises 12 periods), solvent is injected into bed n°1, extract is withdrawn from bed n°3, feed is injected into bed n°7 and raffinate is withdrawn from bed n°9. At the start of the second period of the cycle, the injection and withdrawal points are displaced by one bed and solvent is thus injected into bed n°2, extract is withdrawn from bed n°4, feed is injected into bed n°8 and raffinate is withdrawn from bed n°10. The cycle continues until the twelfth period where solvent is injected into bed n°12, extract is withdrawn from bed n°2, feed is injected into bed n°6 and raffinate is withdrawn from bed n°8.

At the end of the first period, the line connecting distributor n°1 to the valve managing the streams is thus full of solvent. At the start of the fourth period, raffmate is withdrawn from bed n°12, via the line through which solvent was injected during period 1. During the time required for evacuating the volume of that line, solvent is removed instead of raffinate. This results in needless dilution which results in over-consumption of solvent and thus increased operating costs. At the end of the fourth period, that line is full of raffinate. During the seventh period, feed is injected into bed n°1. For a certain time, raffinate is forced back into bed n°1 instead of injecting feed. This results in the para-xylene in the feed being diluted by raffinate. Since the productivity of the unit is proportional to the concentration of para-xylene in the feed, the overall result is a drop in productivity. At the end of the seventh period, the line is full of feed. During the tenth period, extract is withdrawn from bed n°12. During the time required to flush the line, feed is extracted instead of extract. This results in a very large reduction in purity since the para-xylene content in the feed is of the order of 20% (thus 80% impurities). Such contamination renders the production of very high purity paraxylene impossible. At the end of the tenth period, the line is full of extract. At the start of the first period, solvent forces the contents of the line back into the adsorber at the start of the para-xylene desorption zone (zone 1). A portion of the para-xylene thus remains adsorbed on the fixed phase, and is subsequently partially eluted in the raffinate stream. This results in a loss of para-xylene yield.

In summary, contamination due to the use of a common line connecting each of the four streams of the process to the inlet to the distributor plate causes and increase in solvent consumption, a reduction in productivity, a very large reduction in purity and a reduction in yield.

While the PAREX process provides an injection step between withdrawing extract and injecting feed, of the only two documents published on this subject, one concerns injecting one or two internal reflux streams of extract or distilled raffmate located either between the extract and the feed, or between the feed and the raffmate (U.S. Pat. No.

3,761,533) and the other concerns injecting a flushing fluid of indeterminate nature at a position which is also indeterminate (U.S. Pat. No. 4,434,051). Re-injecting extract or solvent between the feed and the extract only solves the problem of a large reduction in purity.

In our ÉLUXYL process, instead of using a single valve to connect the different streams and each bed, one on-off valve per stream and per bed is provided.

While each of the valves is located as close as possible to the bed it serves, each distributor still has to be connected to a solvent valve, an extract valve, a feed valve, a raffinate valve and optionally an internal reflux valve.

SUMMARY OF THE INVENTION

The aim of the present invention is to overcome the disadvantages of the prior art.

Figure 1:
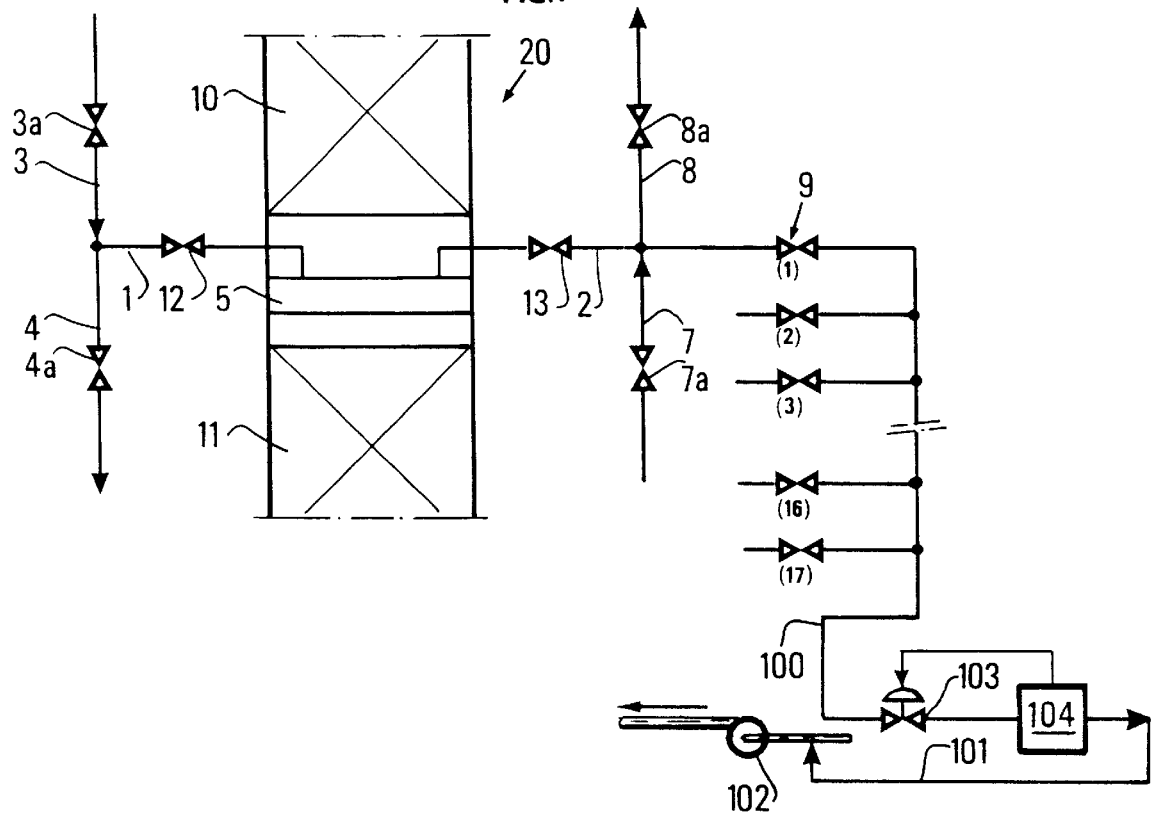
FIG. 1 schematically shows an assembly of means for flushing the apparatus.

More precisely, the invention provides a flushing apparatus in a unit for separating a desired product from a feed using simulated moving bed adsorption comprising a plurality of beds 10, 11 and an adsorbent, characterized in that each bed is connected to a distribution means 5 comprising a first and a second fluid distribution line 2,1, the first distribution line 2 of each distribution means being connected either to at least one inlet 7 for a feed and to at least one outlet 8 for an effluent which is depleted in the desired product, or to at least one solvent inlet 3 and to at least one outlet 4 for an effluent which is rich in the desired product, the second line 1 being connected to at least one inlet and to at least one outlet which are not connected to said first line 2, each inlet and outlet comprising an on-off valve 7a, 8a, 3a, 4a, said first distribution line 2 comprising a flushing valve 9, all of the flushing valves 9 relating to all of the distribution lines 2 being connected to means 100, 102 for circulating a fluid to be displaced.

The apparatus also comprises a control means 50 for opening or closing the flushing valves 9 and the on-off valves 3a, 4a, 7a, 8a.

The operating conditions for the apparatus and the choice of adsorbent can be such that the effluent which is depleted in desired product, for example paraxylene from a mixture of aromatic C$_8$ isomers, is in the raffinate (least adsorbed fraction) while the effluent which is rich in para-xylene is in the extract (most adsorbed fraction). However, in accordance with the prior art, the adsorbent can be modified so that the raffinate is rich in the desired product and the extract is depleted in the desired product.

The means for circulating fluid can comprise at least one pump 102 for circulating fluid and at least one means 103, 104 for controlling the flow rate of fluid circulating in the first line 2.

The second distribution line can comprise a flushing valve 19, all of the flushing lines relating to all of the distribution lines 1 being connected to means 100b for circulating fluid to be displaced similar to those connected to the first circulation line.

As an example, when the first circulation line is connected to the feed inlet and to the outlet for effluent which is depleted in the desired product, the second circulation line is connected to the solvent inlet and to the outlet for effluent which is rich in the desired product. Flushing valve 19 and circulation means 100b thus prevent too great a dilution of the desired product by the solvent and re-inject a small quantity of effluent which is rich in the desired product at the start of solvent injection.

A control means can be adapted to synchronise opening and closing of these flushing valves with the other operations of the process at appropriate times in the cycle and the periods constituting it.

The adsorption process can be a simulated counter-current or simulated cocurrent process. It is described in the following patents: U.S. Pat. No. 2,985,589, U.S. Pat. No. 4,498,991, U.S. Pat. No. 5,422,007, EP-B-0 531 191, which are hereby incorporated by reference.

The desorbent or solvent can be a liquid or it can be in a supercritical, subcritical or gaseous phase. Under these conditions, the term "solvent circulation pump" also includes a compressor.

The invention also concerns the use of a flushing apparatus in a process for separating a feed into at least one of its constituents, to flush during each period, at a given bed, the common section with volume v located in at least one distribution line 2 between the fluid distribution line 5, the on-off valves 7a, 8a at the fluid inlet and outlet, and the flushing valve 9.

This separation process can be used for separating paraxylene from a feed of aromatic hydrocarbons containing 8 carbon atoms comprising xylenes, to prepare terephthalic acid or anhydride, which is an intermediate in the synthesis of nylons, or methyl terephthalate, which is an intermediate in the synthesis of certain plastic materials.

It can also be applied to separating diethylbenzenes and separating ethylbenzene, normal- and iso-paraffins, olefins, sugars, and more generally to separating mixtures of products suitable for adsorption or chromatography, for example separating optical isomers.

It is applicable to separating para-diethylbenzene from a mixture of ethylbenzenes, which is a good desorbent.

Withdrawal of the contents of a common section with volume v relating to the first distribution line 2 can be synchronised and at a flow rate of vit for a time t corresponding to at least a portion of the permutation period.

Further, withdrawal of the contents of a common section with volume v' relating to the second distribution line 1 can be synchronised and at a flow rate of v'/t for a time t corresponding to at least a portion of the permutation period.

The purity of the extract and that of the raffinate can be increased by flushing each distribution line supplying the distributor plate with desorbent and feed respectively.

Figure 2:
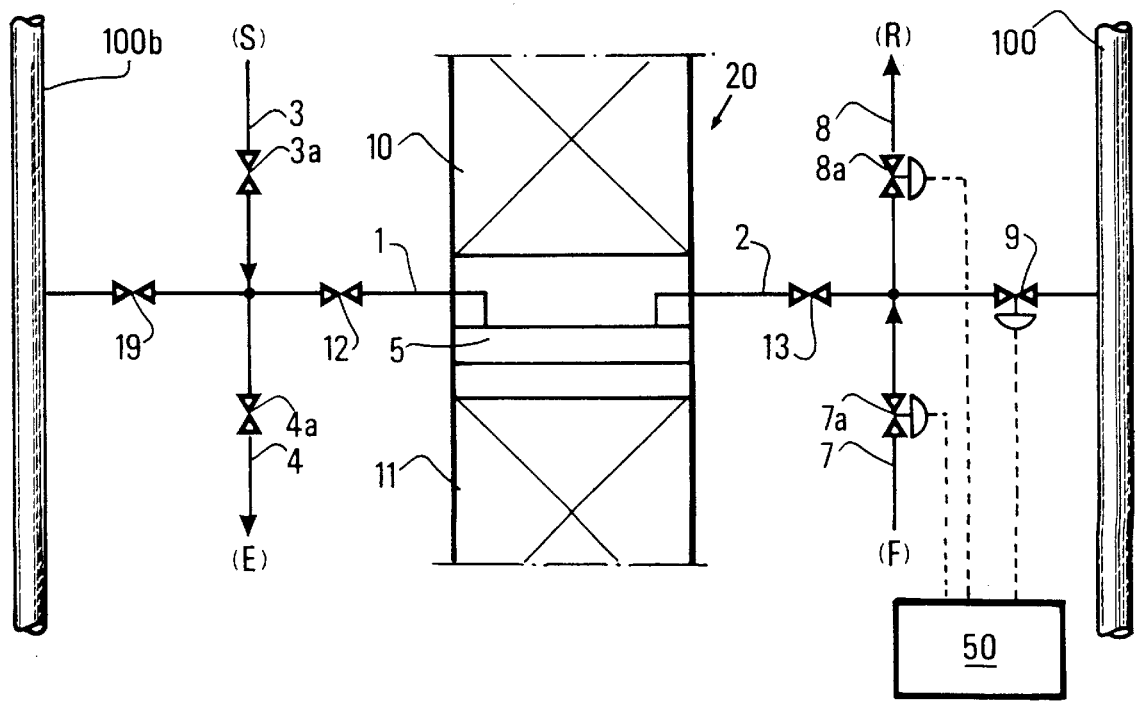
FIG. 2 schematically shows in more detail a variation of the apparatus in one of the beds of the adsorber.

In FIGS. 1 and 2, an adsorber 20 located in one or more columns contains a suitable adsorbent and comprises, for example, seventeen beds 10, 11. Each bed is connected via a distributor plate 5 to a line 2 which periodically receives a supply of feed 7, or raffinate 8 which is depleted in the desired product is withdrawn, controlled by valves 7a and 8a.

A line 1 connected to distributor plate 5 is connected to a solvent supply line and to a line for withdrawing an extract which is rich in the desired product.

Line 2 is connected to a circulation line 100 for a flushing fluid (extracted from the adsorber) which receives all the lines 2 originating from the assembly of adsorbent beds 10, 11. Each line 2 is controlled by a flushing valve 9 located between the supply or withdrawal lines and line 100. A further, block, valve 13 is located in line 2 between the supply or withdrawal lines and the distributor plate 5 and can isolate a particular bed. All of these valves 9 are connected to an opening or closing control means 50, which can also control the operation of all of valves 7a, 8a, 13 of the apparatus.

For simplification (FIG. 1), flushing valves 9 numbered 1 to 17 correspond to the 17 beds of the adsorber. Circulation line 100 is connected by a line 101 via a valve 103 to the inlet to a feed supply pump 102, for example. The flow rate in line 100 is controlled by a regulating valve 103 and a flow meter 104.

The apparatus described above can draw off the contents (feed or raffinate) of the section of line 2 between distributor plate 5, valves 7a and 8a and flushing valve 9. In this fashion, any risk of contaminating the extract by feed or raffinate is avoided.

On any one distributor plate 5, a line 1 comprising a block valve 12 is connected to extract line 4 and solvent line 3 controlled by valves 4a and 3a respectively.

Block valve 12 on line 1 upstream of distributor plate 5 isolates the adsorbent bed. All of the valves corresponding to the assembly of distributor plates can be controlled by control means 50 which controls their opening or closing.

If needless dilution of the extract is to be avoided, line 1 can be connected (see FIG. 2) to a further circulation line 100b via a further flushing valve 19. This circulation line 100b is connected to the intake to a solvent pump, for example, with a controlled flow rate (not shown in FIG. 2). The assembly of valves 19 is controlled by the control means (not shown in the Figure).

The major disadvantages of injecting solvent and withdrawing extract via line 1 and injecting feed and withdrawing raffinate via line 2 without a flushing valve are as follows:

When solvent is injected via line 1 which is full of extract, this results in a moderate loss of yield. When extract is withdrawn via line 1, this latter is full of solvent: this causes needless dilution which results in over-consumption of solvent. When feed is injected into line 2 it is full of raffinate, and this results in needless dilution of the constituents of the feed by raffinate. Finally, when raffinate is extracted via line 2, the line is full of feed: this results in a large drop in yield.

Thus flushing valve 9 is intended to withdraw the feed contained in line 2 just before withdrawing raffinate so that this line is already full of raffinate at the moment when the raffinate valve opens. The feed contained in line 2 is withdrawn via flushing valve 9 and sent to the intake of feed pump 102 by means of flow control means 103 and 104 and line 101. It is clear that this disposition is intended to increase purity of the constituent withdrawn in the form of an extract since line 1 is common to extract and solvent. If the purity of the raffinate is to be increased instead of that of the extract, then the solvent and raffinate are grouped on line 1 and the feed, extract and flush are grouped on line 2.

When the contents of the common line to the feed stream and raffinate stream are to be withdrawn, this is synchronised with the other operations occurring during the period.

When the slug of feed contained in the common section of line 2 is to be drawn off during the period just preceding withdrawal of the raffinate, the following procedure is followed:

Let us assume that in period n°1 of the cycle, raffinate is withdrawn from bed n°12 (valve n°13 serves the outlet from bed 12 and the inlet to bed 13). Flushing valve n°14 is opened and the contents of the common section (of feed) is evacuated via lines 100 and 101 to the intake to the feed pump. A flow rate of v/t or more is imposed for a period of time t or less so that the common volume is flushed at least once during that period. This flow rate is regulated by valve 103 and flow meter 104.

At the end of this operation, the contents of the common section are no longer feed but diluted raffinate and the average feed flow rate has been increased by v/t without over-consumption of feed, by means of the recovered slug of feed.

Regarding the balance of flow rates in the unit, it is desirable to keep the flow rates as close as possible to those of the ideal system without a common section. Either the scheme of FIG. 3a can be used, where the flow rate D3 of zone 3 and that at the start of zone 4 are increased by v/t. However, an increase in the flow rate in zone 3 causes a loss of yield. Thus it is preferable to use the scheme of FIG. 3b where the overall flow rates of feed and raffinate are reduced by v/t. With respect to the ideal scheme with no common section of line for the feed and raffinate, the productivity is lower. However, with respect to the scheme with a common section and without line flushing, the productivity is maintained since the yield loss is prevented. The only difference in internal flow rate with respect to the ideal scheme is that the first bed in zone 4 has a slightly higher flow rate, which is of little consequence.

It is, of course, possible to provide each stage with two flushing valves so as to solve the disadvantages accompanying the solvent and extract being transported by the same line. A flushing valve 19 is thus connected to line 1 and an apparatus analogous to that of FIG. 1 is added to the unit.

Thus the solvent contained in the common section of line 1 is recovered and returned to the intake to the solvent pump, so as to economise on solvent, which is always advantageous as regards operating costs.

Figure 3A:
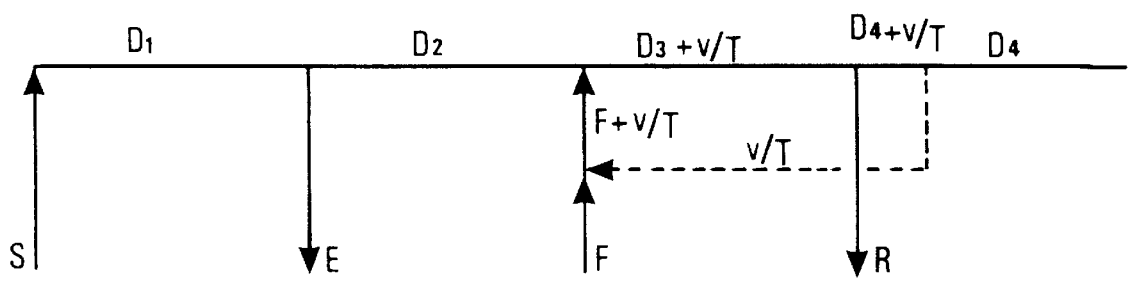
FIGS. 3A, 3B, 4A and 4B constitute line drawings of different flow rate systems.
Figure 3B:
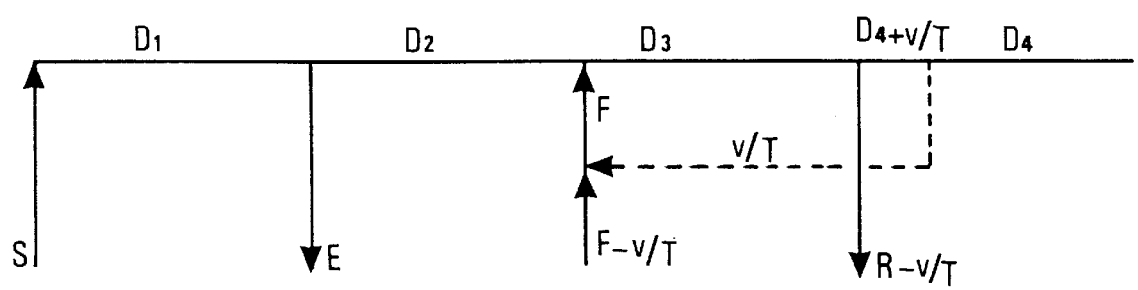
Figure 4A:
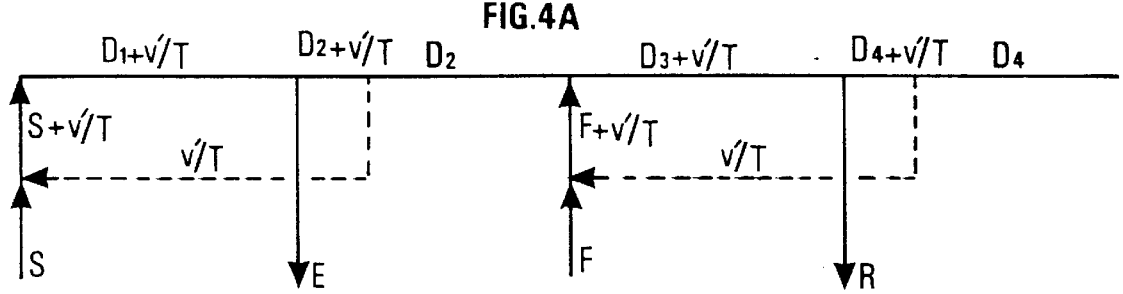
Figure 4B:
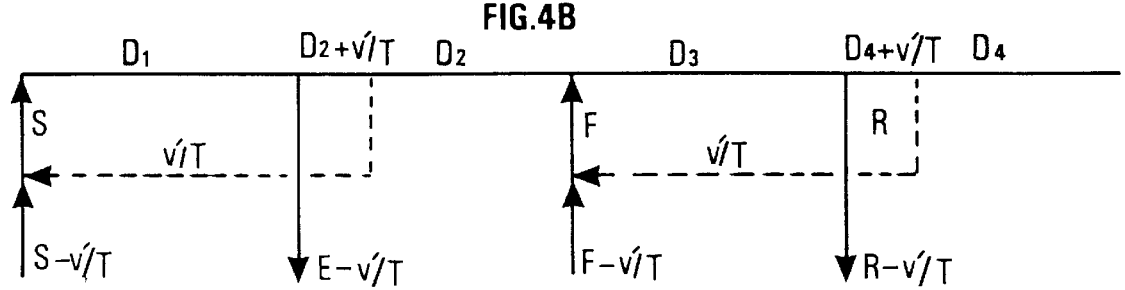

Regarding the flow rate balance in the unit, it will be clear to the skilled person that FIGS. 4a and 4b constitute a simple transposition of FIGS. 3a and 3b.

This operation is synchronised with the other valve openings.

When the slug of solvent contained in the common section of line 1 is to be drawn off during the period just preceding withdrawal of the extract, the following procedure is followed:

Let us assume that in period n°1 of the cycle, extract is withdrawn from bed n°4 (valve n°5 serves the outlet from bed 4 and the inlet to bed 5). Flushing valve n°5 is opened and the contents of the common section (solvent) are evacuated via line 100b to the intake to the solvent pump. A flow rate of v'/t or above is imposed for a period of time t or less so that the common volume is flushed at least once during that period.

At the end of this operation, the contents of the common section are no longer solvent, but concentrated extract and the average solvent flow rate has been increased by v'/t without over-consumption of solvent, by means of the recovered slug of solvent.

Regarding the balance of flow rates in the unit, it is desirable to keep the flow rates as close as possible to those of the ideal system without a common section. Either the scheme of FIG. 4a can be used, where the flow rate of zone 1 and that at the start of zone 2 are increased by v'/t. However, it is preferable to use the scheme of FIG. 4b where the overall flow rates of solvent and extract are reduced by v'/t. With respect to the ideal scheme with no common section of line for the solvent and extract, the productivity is lower. However, with respect to the scheme with a common section and without line flushing, the productivity is maintained since the yield loss is prevented. The only difference in internal flow rate with respect to the ideal scheme is that the first bed in zone 2 has a slightly higher flow rate, which increases purity.

The preceding examples can be repeated with similar success by substituting the generically or specifically described reactants and/or operating conditions of this invention for those used in the preceding examples.

The entire disclosure of all applications, patents and publications, cited above and below, and of corresponding French application 95/15.071, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A flushing apparatus in a unit for separating a product from a feed using simulated moving bed adsorption, comprising a plurality of serially connected beds (10, 11) each containing adsorbent, characterized in that each bed is connected to a distribution means (5) comprising a first and a second fluid distribution line (2,1), the first distribution line (2) of each distribution means being connected either to at least one inlet (7) for a feed and to at least one outlet (8) for an effluent which is depleted in the product, or to at least one solvent inlet (3) and to at least one outlet (4) for an effluent which is rich in the product, the second line (1) being connected to at least one inlet and to at least one outlet which are not connected to said first line (2), each inlet and outlet comprising an on-off valve (7a, 8a, 3a, 4a), said first distribution line (2) comprising at least one flushing valve (9), downstream of valves of a supply line and a withdrawing line, all of the flushing valve or valves (9) relating to all of the first distribution line or lines (2) being connected to means (100,102) for circulating a fluid to be displaced; the apparatus being further characterized in that it comprises a control means (50) for opening or closing the flushing valve or the flushing valves (9) and the on off valves (3a, 4a, 7a, 8a).

2. An apparatus according to claim 1, in which the circulation means (100, 102) comprise at least one pump (102) for circulating fluid and at least one means (103, 104) for controlling the flow rate of fluid circulating in the line.

3. An apparatus according to claim 2, in which the second distribution line (1) comprises a flushing valve (19), all of the flushing lines relating to all of the distribution lines (1) being connected to means (100b) for circulating fluid to be displaced, and in which a control means is adapted to open or close said flushing valves (19).

4. An apparatus according to claim 1, in which the second distribution line (1) comprises a flushing valve (19), all of the flushing valves relating to all of the distribution lines (1) being connected to means (100b).

5. The flushing apparatus according to claim 1, wherein the plurality of serially connected beds are mounted in a closed loop inside of an absorber.

6. The flushing apparatus according to claim 1, wherein the flushing apparatus further comprises a distributer plate communicating with at least two beds and the first and second fluid distribution lines.

7. A flusing apparatus in a unit for separating a product from a feed using simulated moving bed adsorption, comprising a plurality of serially connected beds (10, 11) each containing adsorbent, characterized in that each bed is connected to a distribution means (5) comprising a first and a second fluid distribution line (2,1), the first distribution line (2) of each distribution means being connected either to at least one inlet (7) for a feed and to at least one outlet (8) for an effluent which is depleted in the product, or to at least one solvent inlet (3) and to at least one outlet (4) for an effluent which is rich in the product, the second line (1) being connected to at least one inlet and to at least one outlet which are not connected to said first line (2), each inlet and outlet comprising an on-off valve (7a, 8a, 3a, 4a), said fast distribution line (2) comprising at least one flushing valve (9), all of the flushing valve or valves (9) relating to all of the first distribution line or lines (2) being connected To means (100,102) for circulating a fluid to be displaced; the apparatus being further characterized in that it comprises a control means (50) for opening or closing the flushing valves (9) and the on-off valves (3a, 4a, 7a, 8a) in sequential order so as to permit the flushing valve or flushing valves (9) to be open for a period of time to permit withdrawal of fluid from said first distribution line or lines (2).

8. The flushing apparatus according to claim 7, wherein the plurality of serially connected beds are mounted in a closed loop inside of an absorber.

9. The flushing apparatus according to claim 7, wherein the flushing apparatus further comprises a distributer plate communicating with at least two beds and the first and second fluid distribution lines.

10. A flushing apparatus in a unit for separating a product from a feed using simulated moving bed adsorption, comprising a plurality of serially connected beds (10, 11) each containing adsorbent, characterized in that each bed is connected to a distribution means (5) comprising a first and a second fluid distribution line (2,1), the first distribution line (2) of each distribution means being connected either to at least one inlet (7) for a feed and to at least one outlet (8) for an effluent which is depleted in the product, or to at least one solvent inlet (3) and to at least one outlet (4) for an effluent which is rich in the product, the second line (1) being connected to at least one inlet and to at least one outlet which are not connected to said first line (2), each inlet and outlet comprising an on-off valve (7a, 8a, 3a, 4a), said first distribution line (2) comprising flushing means for removal of fluid from said first distribution line (2), said flushing means comprising at least one flushing valve (9), all of the flushing valve or valves (9) relating to all of the first distribution line or lines (2) being connected to means (100,102) for circulating a fluid to be displaced; the apparatus being further characterized in that it comprises a control means (50) for opening or closing the flushing valve or flushing valves (9) and the on-off valves (3a, 4a, 7a, 8a).

11. The flushing apparatus according to claim 10, wherein the plurality of serially connected beds are mounted in a closed loop inside of an absorber.

12. The flushing apparatus according to claim 10, wherein the flushing apparatus further comprises a distributer plate communicating with at least two beds and the first and second fluid distribution lines.

13. A flushing apparatus in a unit for separating a product from a feed using simulated moving bed adsorption, comprising a plurality of serially connected beds (10, 11) each containing adsorbent, chacterized in that each bed in a closed loop inside an absorber is connected to a distribution means (5) comprising a first and a second fluid distribution line (2,1), the fist distribution line (2) of each distribution means being connected either to at least one inlet (7) for a feed and to at least one outlet (8) for an effluent which is depleted in the product, or to at least one solvent inlet (3) and to at least one outlet (4) for an effluent which is rich in the product, the second line (1) being connected to at least one inlet and to at least one outlet which are not connected to said first line (2), each inlet and outlet comprising an on-off valve (7a, 8a, 3a, 4a), said first distribution line (2) comprising at least one flushing valve (9), all of the flushing valve or valves (9) relating to all of the first distribution line or lines (2) being connected to means (100,102) for circulating a fluid to be displaced; the apparatus being further characterized in that it comprises a control means (50) for opening or closing the flushing valve or flushing valves (9) and the on-off valves (3a, 4a, 7a, 8a).

14. The flushing apparatus according to claim 13, wherein the flushing apparatus further comprises a distributer plate communicating with at least two beds and the first and second fluid distribution lines.

* * * * *

UNITED STATES PATENT AND TRADEMARK OFFICE
CERTIFICATE OF CORRECTION

PATENT NO.    : 6,284,200 B1
DATED         : September 4, 2001
INVENTOR(S)   : Gerard Hotier It is certified that error appears in the above-identified patent and that said Letters Patent is hereby corrected as shown below:

Title page,
Item [54], change "FLUSHING APPARATUS IN A SIMULATED MOBILE BED ADSORPTION UNIT COMPRISING TWO FLUID DISTRIBUTION LINES, AND THE USE THEREOF" to -- FLUSHING APPARATUS IN A SIMULATED MOVING BED ADSORPTION UNIT COMPRISING TWO FLUID DISTRIBUTION LINES, AND THE USE THEREOF" --

Column 7,
Line 45, change "on off" to -- on-off --

Column 8,
Line 1, change "flusing" to -- flushing --
Line 14, change "fast" to -- first --

Signed and Sealed this

Twelfth Day of November, 2002

Attest:

Attesting Officer

JAMES E. ROGAN
Director of the United States Patent and Trademark Office